(12) United States Patent
Tortora et al.

(10) Patent No.: US 11,029,648 B2
(45) Date of Patent: Jun. 8, 2021

(54) SYSTEM AND METHOD FOR DETERMINING AT LEAST ONE PARAMETER RELATING TO AN ANGULAR MOVEMENT OF AN ARBOR COMPRISING A ROTATING REFLECTOR WITH CONTIGOUS OBLIQUE CHAMFERS

(71) Applicant: The Swatch Group Research and Development Ltd, Marin (CH)

(72) Inventors: Pierpasquale Tortora, Neuchatel (CH); Vittorio Zanesco, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 57 days.

(21) Appl. No.: 16/680,988

(22) Filed: Nov. 12, 2019

(65) Prior Publication Data
US 2020/0201255 A1    Jun. 25, 2020

(30) Foreign Application Priority Data
Dec. 21, 2018  (EP) .................................... 18215440

(51) Int. Cl.
*G04B 9/00* (2006.01)
*G01P 3/36* (2006.01)
(52) U.S. Cl.
CPC ................ *G04B 9/005* (2013.01); *G01P 3/36* (2013.01)
(58) Field of Classification Search
CPC ...... G01D 5/3473; G04B 9/005; G04C 3/001; G01P 3/36
(Continued)

(56) References Cited

U.S. PATENT DOCUMENTS

| 9,797,753 B1 | 10/2017 | Gowreesunker et al. |
| 9,983,029 B2 * | 5/2018 | Rai ...................... G01D 5/3473 |
| 10,145,711 B2 | 12/2018 | Boonsom et al. |

FOREIGN PATENT DOCUMENTS

| CN | 205403811 U | 7/2016 |
| CN | 105911854 A | 8/2016 |

(Continued)

OTHER PUBLICATIONS

Communication dated Jan. 22, 2021 from the State Intellectual Property Office of the P.R. of China in Application No. 201911325358.0.

(Continued)

*Primary Examiner* — Que Tan Le
(74) *Attorney, Agent, or Firm* — Sughrue Mion, PLLC

(57) ABSTRACT

A system and method to determine an angular movement of an arbor integral with a crown of a watch, the arbor being rotatable in a longitudinal direction. Included is a rotating reflector mounted on the arbor, and two emitter/detector pairs disposed on either side of the reflector. Each emitter/detector pair includes a light source for illuminating the reflector, and a light detector for receiving the light reflected on the reflector and for generating an electrical signal representative of the reflected light. A processor processes the electrical signals and determine a parameter relating to the angular movement of the arbor. The rotating reflector's visible outer surface changes when the reflector rotates on itself in a regular manner, such that the representative electrical signal generated by said detector of the pair has a substantially sinusoidal shape when the reflector rotates on itself in a regular manner in a same direction of rotation.

14 Claims, 3 Drawing Sheets

(58) Field of Classification Search
USPC .......................................... 250/231.13, 221
See application file for complete search history.

(56) References Cited

FOREIGN PATENT DOCUMENTS

| | | |
|---|---|---|
| CN | 108227464 A | 6/2018 |
| EP | 2 884 239 A1 | 6/2015 |
| EP | 3 015 925 A1 | 5/2016 |

OTHER PUBLICATIONS

European Search Report issued in EP 18 21 5440 dated May 14, 2019.

* cited by examiner

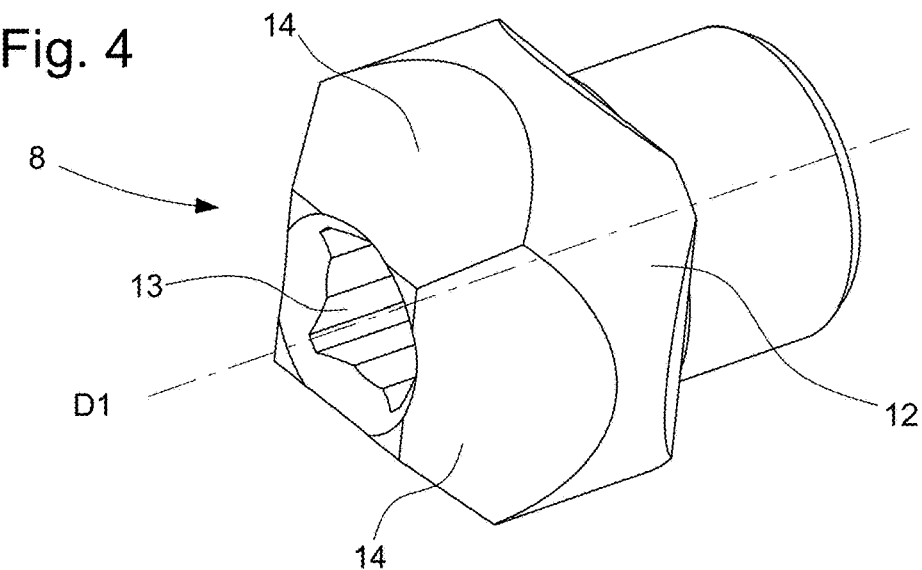
Fig. 4
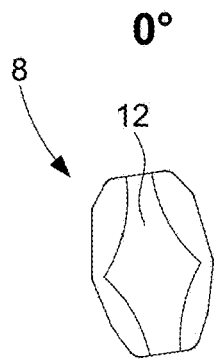
Fig. 5a
0°
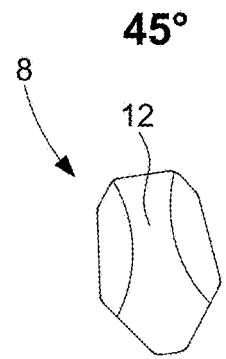
Fig. 5b
45°
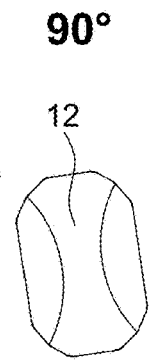
Fig. 5c
90°
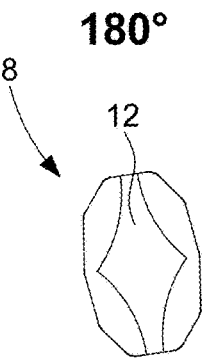
Fig. 5d
180°
Fig. 6
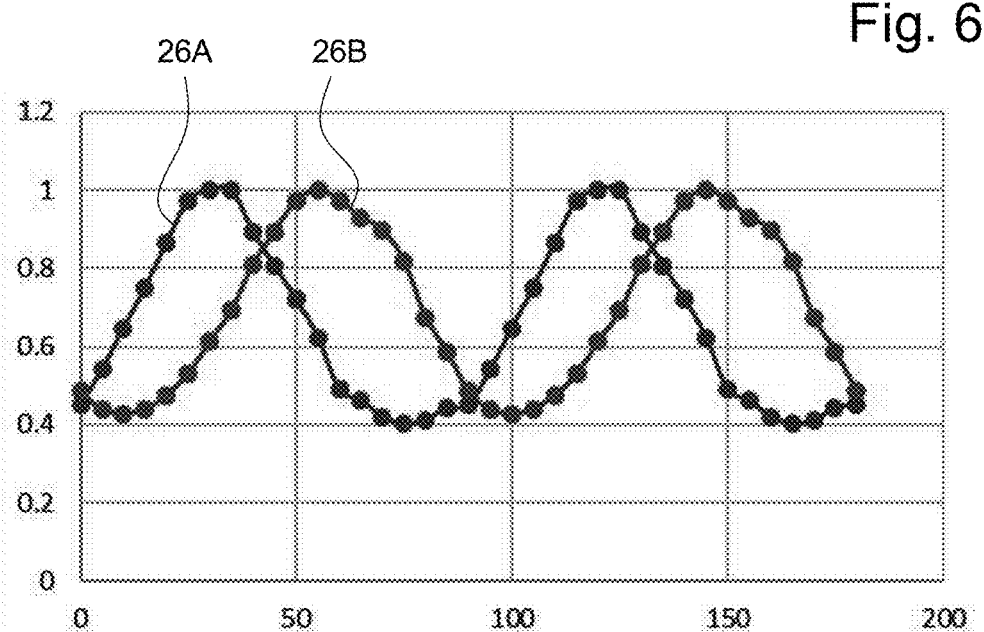

SYSTEM AND METHOD FOR DETERMINING AT LEAST ONE PARAMETER RELATING TO AN ANGULAR MOVEMENT OF AN ARBOR COMPRISING A ROTATING REFLECTOR WITH CONTIGOUS OBLIQUE CHAMFERS

CROSS-REFERENCE TO RELATED APPLICATIONS

This application claims priority to European Patent Application No. 18215440.1, filed Dec. 21, 2018, the entire contents of which are incorporated herein by reference.

FIELD OF THE INVENTION

The invention concerns a system and a method for determining at least one parameter relating to an angular movement of an arbor able to rotate on itself. Such a parameter is, for example, the angular position, or speed of rotation, or direction of rotation of the arbor.

The invention also concerns a timepiece comprising the determination system. The timepiece is, for example, a quartz watch, the arbor then being the stem integral with a time-setting crown.

STATE OF THE ART

It is known to provide a watch, for example a quartz watch, with an electronic crown by means of which a user can set the time and thus the position of the hands, without contact with the gear train of the watch. To do so, an electronic or optical or electro-optical device is arranged inside the watch, which makes it possible to determine one or more parameters relating to the angular movement of the arbor integral with the crown, and thus to position the hands in the position desired by the user. More specifically, the rotational action of the crown made by the user is converted by the device into an electronic pulse to a watch processor, in order to communicate thereto how many steps and in which direction the hands must be turned. This type of coding may, for example, be achieved via a galvanic contact, a magnetic coil using the Hall effect, a capacitive device, or an electro-optical device implementing light signal transmission and detection.

Such an electro-optical device, in particular for determining the angular position and/or direction of rotation of the arbor integral with a watch crown, is, for example, disclosed in European Patent document No. EP 3 015 925 A1. The stem integral with the crown has a reflection surface on its external periphery. The device has a light source intended to illuminate the reflection surface, and a light detector intended to receive a reflected light beam from the reflection surface and to generate an electrical signal representative of the beam. The device further includes a processor configured to form, from the electrical signals received from the detector, at least two pixel patterns at two different instants. The processor is also configured to compare the successive pixel patterns, and to deduce therefrom at least one parameter relating to the angular movement of the stem if a shift occurs between the pixel patterns.

However, one drawback of the electro-optical device proposed in EP 3 015 925 A1 is that it generates relatively long processing times for the processor, due to the amount of data acquired. This solution thus requires providing sufficient power for the processor, which affects both the overall size of the latter and the power consumption of the device. Given that the space and energy available are particularly restricted in a watch, this may prove problematic for the overall dimensions of the system and its autonomy.

U.S. Pat. No. 9,797,753 B1 discloses an optical encoder for setting watch functions. The encoder includes a rotating shaft with a patterned surface, a light source for illuminating the patterned surface, an array of optical sensors for receiving a portion of a reflection of light on the patterned surface and a processor for processing the information from the optical sensors. A single light source is provided, which means that it is not possible to precisely and simply determine every angular movement of the rotating shaft.

SUMMARY OF THE INVENTION

It is thus an object of the invention to provide an electro-optical system for determining at least one parameter relating to an angular movement of an arbor able to rotate on itself, which makes it possible to operate with a limited amount of acquired data in order to reduce the processing power required, while ensuring precise and rapid determination of the parameter(s).

To this end the invention concerns a system for determining at least one parameter relating to an angular movement of an arbor, particularly an arbor integral with a timepiece crown, which includes the features mentioned in the independent claim 1.

Specific embodiments of the system are defined in the dependent claims 2 to 7.

Due to the particular shape of the rotating reflector, the light detectors of the system of the invention each generate a representative electrical signal, which has a substantially sinusoidal shape, when the reflector rotates on itself in a same direction of rotation. More specifically, the visible outer surface of the reflector, seen from each emitter/detector pair, changes when the reflector rotates on itself, such that the representative electrical signal generated by each detector has a substantially sinusoidal shape, when the reflector rotates on itself in a same direction of rotation. The visible outer surface of the reflector forms the active reflective portion thereof. Due to the substantially sinusoidal shape of the signals generated by the detectors, the processing performed by the system processor, to determine the parameter(s) relating to the angular movement of the arbor, is reduced. This makes it possible to determine the parameter(s) in a precise, reliable manner and with a limited amount of acquired data allowing a fast processing time, compactness and minimal energy consumption of the processor.

Advantageously, the two emitter/detector pairs are arranged with respect to the rotating reflector such that the two emitters, respectively the two detectors, are arranged head-to-tail with respect to the other. This makes it possible to introduce a phase shift between the signals generated by the two light detectors when the reflector rotates on itself. Such a phase shift makes it possible for the computer program product implemented in memory means of the system to determine the direction or speed of rotation of the arbor. Further, owing to this spatial arrangement of the two emitter/detector pairs, none of the light detectors misses the reflected light beam from the reflector.

Advantageously, the two emitter/detector pairs are arranged on either side of the rotating reflector, on a circle whose centre is substantially the centre of the rotating reflector, and are offset from each other by an angle having a value other than 180°. This feature makes it possible to introduce a phase shift and/or to enhance the existing phase shift between the signals generated by the two light detectors when the reflector rotates on itself. Indeed, the two emitter/detector pairs do not see the reflector at the same angle, which introduces a phase shift between the generated signals. Preferably, the total phase shift created between the two signals is at least 25°, more preferably still substantially equal to 90°.

According to a particular technical feature of the invention, the rotating reflector is formed from a cylinder of revolution, on the edges of which are arranged several contiguous, oblique chamfers, the outer surface of the non-chamfered part of the reflector forming said active reflective portion of the reflector. The chamfers are preferably formed from the edges and two sides of the cylinder of revolution from a median part.

Advantageously, each oblique chamfer defines an angle substantially equal to 50° with a plane tangent to the external surface of the non-chamfered part of the reflector, and parallel to the longitudinal direction. The choice of this particular angle makes it possible to obtain a good compromise between an adequate intensity value of the representative signal generated by the detector, and a good dynamic of this same signal. This makes it possible to improve the precision and reliability of determination of parameter(s) relating to the angular movement of the arbor.

To this end, the invention also concerns a timepiece comprising the determination system described above, and which includes the features mentioned in the independent claim 8.

A particular embodiment of the timepiece is defined in the dependent claim 9.

To this end, the invention also concerns a method for determining at least one parameter relating to an angular movement of an arbor, particularly an arbor integral with a timepiece crown, by means of the determination system described above, and which includes the features mentioned in the independent claim 10.

Particular embodiments of the method are defined in the dependent claims 11 to 13.

Advantageously, the method further includes a step, implemented by the processor, consisting in representing the two received electrical signals as the sine and cosine of a same function and calculating an arctangent function whose variable is the ratio between the two signals. This makes it possible to determine the angular position of the arbor at any time and in an unequivocal manner.

Advantageously, the method further includes a step, implemented by the processor, consisting in determining, according to the sign of the slope of the calculated arctangent function, the direction of rotation of the arbor.

Advantageously, the method further includes a step, implemented by the processor, consisting in alternately controlling the illumination of each of the light sources. This prevents the detector of one of the emitter/detector pairs being affected by the light from the emitter of the other emitter/detector pair.

To this end the invention also concerns a computer program including program instructions stored in memory means of the determination system described above and which, when executed by the system processor, are capable of implementing the determination method as described above, and which includes the features mentioned in the independent claim 14.

BRIEF DESCRIPTION OF THE DRAWINGS

The objects, advantages and features of the determination system and method according to the invention, and of the timepiece containing the system, will appear more clearly in the following description, based on at least one non-limiting embodiment illustrated by the drawings, in which:

FIG. 4 is a perspective view of the rotating reflector of FIG. 2.

FIGS. 5a-5d are side views of the rotating reflector of FIG. 2, in different respective angular positions of the reflector.

FIG. 6 is a diagram representing the evolution of two electrical signals generated by the detectors of the two emitter/detector pairs as a function of the angular position of the rotating reflector.

DETAILED DESCRIPTION OF THE INVENTION

Figure 1:
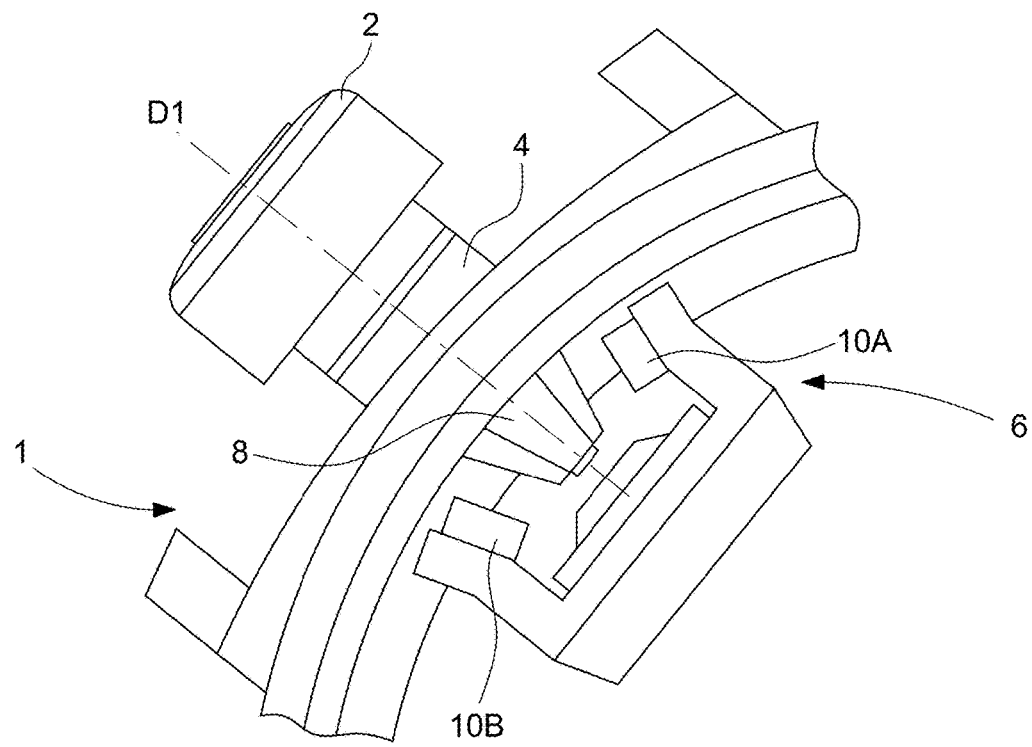
FIG. 1 is a perspective view of a watch provided with a time-setting crown, and a system for determining at least one parameter relating to an angular movement of the arbor integral with the crown, according to the invention.

FIG. 1 represents a part of a watch 1 provided with a time-setting crown 2. Crown 2 is joined to an arbor 4 which extends partly inside watch 1, particularly inside the watch case. Watch 1, which is, for example, a quartz watch, further comprises a system 6 for determining at least one parameter relating to an angular movement of arbor 4 integral with crown 2.

Arbor 4 is able to rotate on itself around a longitudinal direction D1. More precisely, when crown 2 is rotated by a user to set the time, arbor 4 is driven in rotation on itself around direction D1. It is to be noted that, optionally, crown 2 can be configured to be pulled out and/or pushed in by a user, driving arbor 4 in longitudinal translation. When arbor 4 is fitted to a watch 1, as is the case in the illustrative example of FIGS. 1 to 4, the diameter of arbor 4 is typically comprised in a range from 0.5 to 2 mm.

Figure 2:
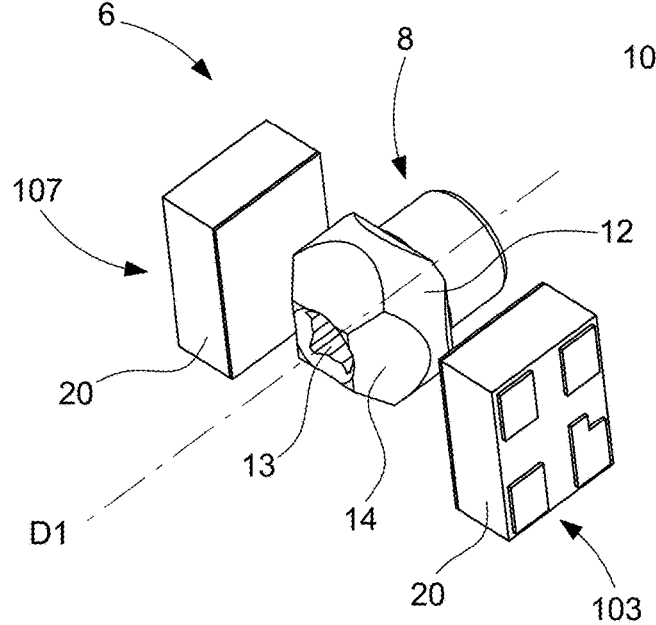
FIG. 2 is a perspective view of the system of FIG. 1, the system comprising a rotating reflector and two emitter/detector pairs.
Figure 3:
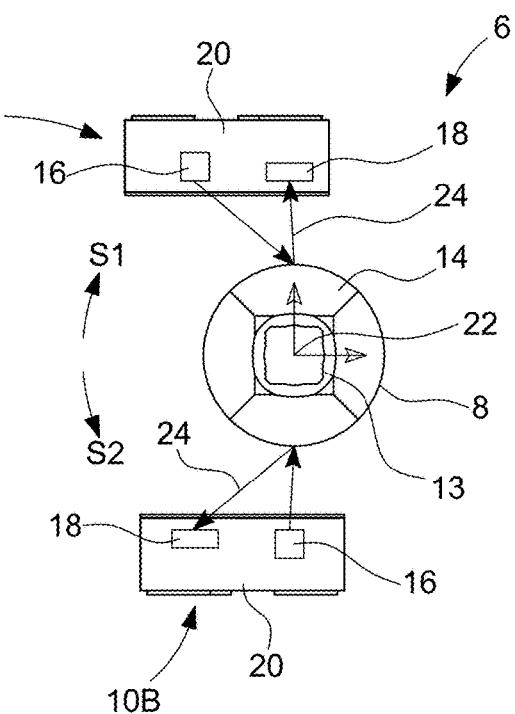
FIG. 3 is a front elevation view of the system of FIG. 2.

As illustrated in FIGS. 2 and 3, in addition to arbor 4, system 6 includes a rotating reflector 8 and two light emitter/detector pairs 10A, 10B. System 6 also includes a processor and memory means but these elements are not represented in the Figures for reasons of clarity.

Rotating reflector 8 is mounted on arbor 4, around the latter. Rotating reflector 8 is thus integral with arbor 4. Rotating reflector 8 is, for example, mounted on an end portion of arbor 4, although this particular arrangement of reflector 8 on arbor 4 is not limiting in the context of the present invention. Reflector 8 and arbor 4 may be made in one piece. Rotating reflector 8 has a shape such that its visible outer surface, seen from each emitter/detector pair 10A, 10B, and which forms an active reflective portion 12 of reflector 8 for each pair 10A, 10B, changes when reflector 8 rotates on itself in a regular manner, particularly at an almost constant speed.

In a preferred embodiment represented in FIGS. 2 to 4, rotating reflector 8 is formed from a cylinder of revolution, on the edges of which are arranged several contiguous, oblique chamfers 14. The initial cylinder typically has a diameter of substantially 1.3 mm and a length of substantially 0.77 mm. Oblique chamfers 14 are, for example, machined on the two edges of the cylinder and preferably in a symmetrical manner. The cylinder is provided with a central through orifice 13 in its longitudinal direction D1, for the passage of an arbor 4. The outer surface 12 of the non-chamfered part of reflector 8 forms the active reflective portion of reflector 8. In the illustrative example of FIGS. 2 to 4, rotating reflector 8 has four contiguous, oblique chamfers 14 having the same surface and the same inclination. In this case, rotating reflector 8 has symmetry of revolution, which is not limiting in the context of the present invention. Other configurations are, in fact, possible for oblique chamfers 14, which may have a different surface and/or inclination. Rotating reflector 8 is, for example, metallic. In such case, outer surface 12 of the non-chamfered part of reflector 8, forming the active reflective portion thereof, is preferably polished. The metal of reflector 8 is preferably chosen such that polished surface 12 reflects well in the wavelengths of light emitted by the light emitters. For example, for infrared light emitters, the metal chosen for reflector 8 may be a gold deposition. The choice of metal for reflector 8 is thus conditioned by the type of light emitters selected and can be adjusted according to the constraints of the product.

Preferably, each oblique chamfer 14 defines an angle substantially equal to 50° with a plane tangent to outer surface 12 of the non-chamfered part of reflector 8, and parallel to longitudinal direction D1.

Each emitter/detector pair 10A, 10B includes one light source 16 and one light detector 18. Light source 16 is typically formed of one or more light emitting diode(s), able, for example, to emit infrared light. Light source 16 and light detector 18 are arranged in a protective case 20 and are preferably optically isolated from each other, for example by means of a separating wall. Each emitter/detector pair 10A, 10B forms, for example, a proximity sensor unit device.

The two emitter/detector pairs 10A, 10B are disposed on either side of rotating reflector 8, facing reflector 8. In a preferred embodiment represented in FIG. 3, the two emitter/detector pairs 10A, 10B are arranged with respect to rotating reflector 8 such that the two emitters 16, respectively the two detectors 18, are arranged head-to-tail with respect to each other. Preferably, as illustrated in FIG. 3, the two emitter/detector pairs 10A, 10B are placed on a circle, whose centre is substantially the centre 22 of rotating reflector 8, and are offset from each other by an angle having a value other from 180°.

Also, preferably, as visible in FIG. 3, the two emitter/detector pairs 10A, 10B and rotating reflector 8 are arranged to define a substantially Y-shaped spatial arrangement. More precisely, rotating reflector 8 is disposed at the centre of the Y, a first emitter/detector pair 10A is disposed at the free end of a short arm of the Y, and the other emitter/detector pair 10B is disposed at the free end of the long arm of the Y. In other words, as seen in FIG. 3, the two emitter/detector pairs 10A, 10B are disposed on either side of rotating reflector 8 and are axially offset from each other.

Each light source 16 is intended to illuminate one part of reflector 8. Each light detector 18 is intended to receive a reflected light beam 24 from reflector 8 and to generate an electrical signal representative of beam 24. Since chamfers 14 are oblique surfaces, they do not reflect light towards detectors 18. Thus, only the visible outer surface 12 of reflector 8, which forms the active reflective portion thereof, reflects light towards detectors 18. The shape of rotating reflector 8 is such that its visible outer surface 12 changes when reflector 8 rotates on itself, such that the representative electrical signal generated by each detector 18 has a substantially sinusoidal shape when reflector 8 rotates on itself in the same direction of rotation S1, S2. Such a signal 26A, 26B is, for example, visible in FIG. 6.

FIGS. 5a to 5d illustrate the change in visible outer surface 12 of reflector 8, seen from one of detectors 18 and rotating in a same direction of rotation S1, S2, for different angular positions of reflector 8 from 0° to 180°, with a 45° step. The visible outer surface 12 of reflector 8 appears to gradually widen and narrow as reflector 8 rotates on itself, passing through a maximum of 0°, as seen in FIG. 5a, and by a minimum of 90°, as seen in FIG. 5c. The change in ratio between visible surfaces 12 of reflector 8, as shown in FIGS. 5a to 5d, may resemble a sine. It is to be noted that the particular shapes taken by visible surface 12 and shown in FIGS. 5a to 5d, are non-limiting in the context of the present invention. Other shapes are possible for visible outer surface 12 provided that the representative electrical signal generated by each detector 18 has a substantially sinusoidal shape when reflector 8 rotates on itself.

The processor is configured to process each of the electrical signals 26A 26B generated by detectors 18. The processor is also configured to determine, according to the processing result, at least one parameter relating to the angular movement of arbor 4, as will be explained in detail below. The parameter(s) determined are, for example, the angular position, speed of rotation, or the direction of rotation of arbor 4.

FIG. 6 represents two signals 26A, 26B from detectors 18, at different angles corresponding to a rotation of rotating reflector 8 of 180° on itself in 5° steps. Each signal 26A, 26B is from a respective detector 18 of one of the emitter/detector pairs 10A, 10B. Each signal 26A, 26B has a substantially sinusoidal shape. Further, in the illustrative example of FIG. 6, signals 26A, 26B are phase shifted from each other by around 25°. Preferably, signals 26A, 26B are phase shifted by at least 25° and preferably substantially 90°.

Figure 7:
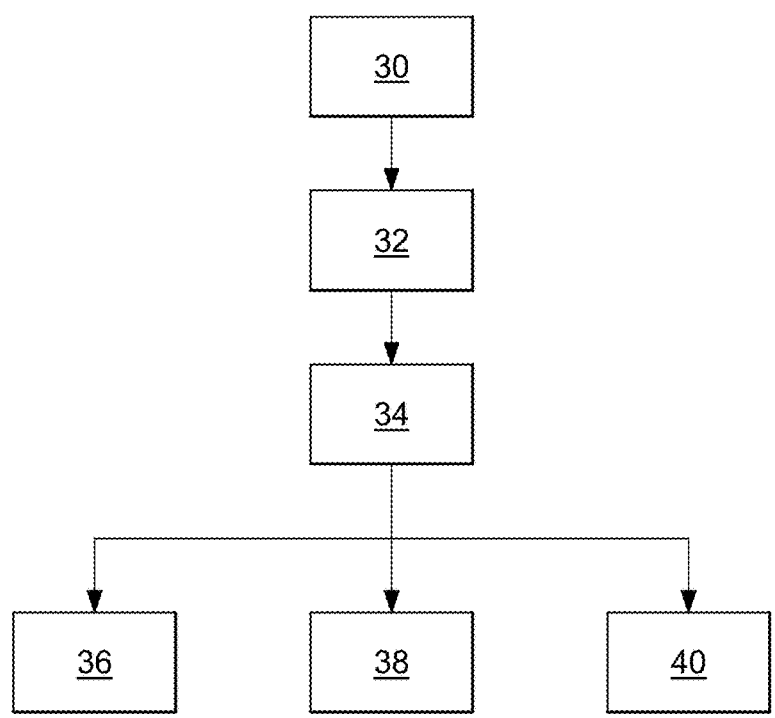
FIG. 7 is a flow chart representing steps of a method for determining at least one parameter relating to an angular movement of an arbor, implemented by the system of FIG. 1.

A method according to the invention for determining at least one parameter relating to an angular movement of arbor 4, implemented by the processor of system 6, will now be described with reference to FIGS. 7 and 8. It is assumed, initially, that a user manipulates arbor 4 to rotate it on itself around longitudinal direction D1, for example, by manipulating crown 2 to set the time of a watch 1. This rotation of arbor 4 causes a rotation of rotating reflector 8 around longitudinal direction D1.

Preferably, the method includes an initial step 30 during which the processor alternately controls the illumination of each of light sources 16.

During an initial or subsequent step 32, the processor receives two electrical signals 26A, 26B from the two light detectors 18. Each of electrical signals 26A, 26B is representative of a reflected light beam 24 from reflector 8 and has a substantially sinusoidal shape.

During a next step 34, the processor determines the frequency of each of the two received sinusoidal signals 26A, 26B.

During a next step 36, the processor determines the speed of rotation of arbor 4, by comparison between the frequency determined during step 34 and a correspondence table pre-stored in the system memory means.

Preferably, the method includes a parallel or next step 38, during which the processor represents the two received electrical signals 26A, 26B as the sine and cosine of a same function, then calculates an arctangent function whose variable is the ratio between the two signals. The result of this calculation is represented in FIG. 8 for the particular example embodiment of signals 26A, 26B represented in FIG. 6. It is noted that, over a half period of revolution of rotating reflector 8 corresponding to 180°, the curve 39 obtained is a straight line. Thus, the processor, which has access to a given value of a calculated arctangent function, can deduce therefrom the angular position of arbor 4, in an unequivocal manner. Further, the sign of the slope of the straight line obtained is a function of the direction of rotation of arbor 4. Thus, the method can comprise a parallel or next step 40 during which the processor determines, as a function of the sign of the slope of the straight line obtained, the direction of rotation of arbor 4.

Figure 8:
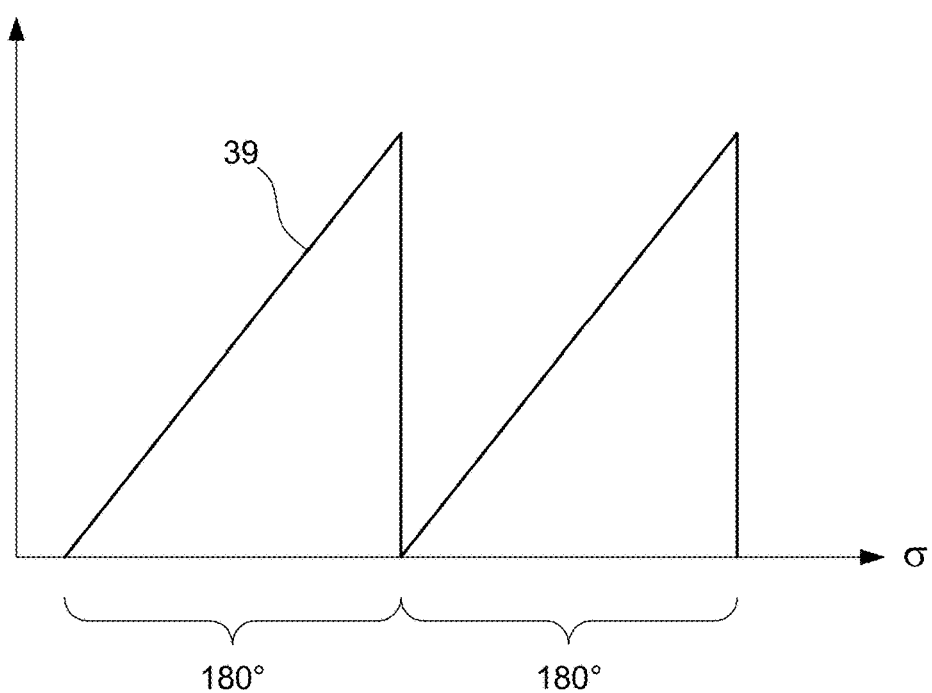
FIG. 8 is a diagram representing the evolution of an arctangent function calculated by a processor of the system of FIG. 2, as a function of the angular position of the rotating reflector.

It is to be noted that, to obtain the shape of curve 39 represented in FIG. 8, signals 26A, 26B must be phase shifted, preferably by at least 25°. Such a phase shift is obtained by the head-to-tail arrangement of emitter/detector pairs 10A, 10B, as described above, and/or by the non-symmetrical arrangement of the two emitter/detector pairs 10A, 10B on either side of rotating reflector 8, as described above. Thus, the resulting phase shift between signals 26A, 26B makes it possible to obtain the shape of curve 39 represented in FIG. 8, and consequently allows the processor to precisely determine the angular position and direction of rotation of arbor 4.

The memory means store a computer program product comprising program instructions, which, when executed by the processor of system 6, are capable of implementing the method as described above.

The invention claimed is:

1. A system (6) for determining at least one parameter relating to an angular movement of an arbor (4), particularly a stem (4) integral with a timepiece (1) crown (2), the system (6) comprising:
    an arbor (4) configured to be able to rotate on itself around a longitudinal direction (D1);
    a rotating reflector (8) mounted on the arbor (4), around said arbor (4)
    two emitter/detector pairs (10A, 10B), the two pairs (10A, 10B) being disposed on either side of the rotating reflector (8), facing the reflector (8), each emitter/detector pair (10A, 10B) comprising a light source (16) intended to illuminate one part of the reflector (8), and a light detector (18) intended to receive a reflected light beam (24) from the reflector (8) and to generate an electrical signal (26A, 26B) representative of said beam (24); and
    a processor configured to process each of the electrical signals generated by the detectors (18), and to determine, as a function of the processing result, said at least one parameter relating to the angular movement of the arbor (4);
    characterized in that the rotating reflector (8) is formed from a cylinder of revolution, on the edges of which are arranged several contiguous, oblique chamfers (14), the outer surface (12) of the non-chamfered part of the reflector (8) seen from each emitter/detector pair (10A, 10B) forming an active reflective portion of the reflector (8) for said pair, which changes when the reflector (8) rotates on itself, such that the representative electrical signal (26A, 26B) generated by said detector (18) of the pair (10A, 10B) has a substantially sinusoidal shape when the reflector (8) rotates on itself in a regular manner in a same direction of rotation (S1, S2).

2. The system (6) according to claim 1, characterized in that the two emitter/detector pairs (10A, 10B) are arranged with respect to the rotating reflector (8) such that the two emitters (16), respectively the two detectors (18), are arranged head-to-tail with respect to each other.

3. The system (6) according to claim 1, characterized in that the two emitter/detector pairs (10A, 10B) are disposed on either side of the rotating reflector (8), on a circle whose centre is substantially the centre (22) of the rotating reflector (8), and are offset from each other by an angle having a value other than 180°.

4. The system (6) according to claim 3, characterized in that the two emitter/detector pairs (10A, 10B) and the rotating reflector (8) are arranged to define a substantially Y-shaped spatial arrangement, the rotating reflector (8) being disposed at the centre of the Y, a first emitter/detector pair (10A) being disposed at the free end of a short arm of the Y, and the other emitter/detector pair (10B) being disposed at the free end of the long arm of the Y.

5. The system (6) according to claim 1, characterized in that, in each emitter/detector pair (10A, 10B), the emitter (16) and the detector (18) are optically isolated from each other.

6. The system (6) according to claim 1, characterized in that each oblique chamfer (14) defines an angle substantially equal to 50° with a plane tangent to the outer surface (12) of the non-chamfered part of the reflector (8) and parallel to the longitudinal direction (D1).

7. The system (6) according to claim 5, characterized in that the rotating reflector (8) is made of metal, the outer surface (12) of the non-chamfered part of the metal reflector being polished.

8. A timepiece (1) comprising a system (6) for determining at least one parameter relating to an angular movement of an arbor (4), characterized in that the determination system (6) conforms to claim 1.

9. The timepiece (1) according to claim 8, characterized in that the timepiece (1) is a quartz watch provided with a time-setting crown (2), said arbor (4) being the stem (4) integral with the crown (2).

10. A method for determining at least one parameter relating to the angular movement of an arbor (4), particularly a stem (4) integral with a crown (2) of a timepiece (1), by means of a determination system (6) according to claim 1, the method comprising the following steps, implemented by the processor:
    receiving (32) two electrical signals (26A, 26B) from two light detectors (18), each of the electrical signals (26A, 26B) being representative of a reflected light beam (24) from the reflector (8), each of the electrical signals (26A, 26B) having a substantially sinusoidal shape;
    determining (34) the frequency of each of the two received electrical signals (26A, 26B);
    determining (36), by comparison between the frequency determined by the processor and a correspondence table pre-stored in memory means of the system (6), the speed of rotation of the arbor (4).

11. The method according to claim 10, characterized in that the method further includes a step (38), implemented by the processor, consisting in representing the two received electrical signals (26A, 26B) as the sine and cosine of the same function and calculating an arctangent function (39) whose variable is the ratio between the two signals.

12. The method according to claim 11, characterized in that the method further includes a step (40), implemented by the processor, consisting in determining, according to the sign of the slope of the calculated arctangent function (39), the direction of rotation of the arbor (4).

13. The method according to claim 10, characterized in that the method further includes a step (30), implemented by the processor, consisting in alternately controlling the illumination of each of the light sources (16).

14. A non-transitory computer readable medium comprising program instructions stored in memory means and which, when executed by the system (6) processor, are able to implement the method according to claim 10, for the determination of at least one parameter relating to an angular movement of an arbor (4).

\* \* \* \* \*